United States Patent Office 3,424,286
Patented Jan. 28, 1969

1

3,424,286
REVERSING CLUTCHES WITH
DUAL OPERATORS
Gerd Otterbach, Wolfgang Grafe, and Reinhard Kessler,
Schweinfurt, Germany, assignors to Fichtel & Sachs
A.G., Schweinfurt, Germany
Filed Nov. 18, 1966, Ser. No. 595,414
Claims priority, application Germany, Nov. 20, 1965,
F 47,731
U.S. Cl. 192—51　　　　　　　　　　　　　　10 Claims
Int. Cl. F16d 11/04, 21/02, 1/10

ABSTRACT OF THE DISCLOSURE

A transmission for a tree-climbing branch lopping machine has two output wheels axially secured but rotatable on a drive shaft, and a coupling wheel splined to the shaft. A control lever and a motion transmitting linkage can shift the coupling wheel from engagement with either output wheel into an axially intermediate idling position, and springs engage the coupling wheel with one of the output wheels when the control lever is released. The coupling wheel is shifted from one to the other output wheel by an automatically operated reversing arm.

---

This invention relates to power trains, and particularly to a transmission for reversing the direction of rotation of an output member during rotation of an input member in one direction.

In its more specific aspects, the invention is concerned with an improved transmission arrangement for an automatic machine which lops branches from the trunk of a standing tree, as described in the copending, commonly owned application, Ser. No. 571,760, filed on Aug. 11, 1966, and the copending, commonly owned application, Ser. No. 527,300, filed on Feb. 14, 1966, now Patent No. 3,364,961.

The apparatus disclosed in those applications partly consists of a supporting structure equipped with wheels set for movement about a tree trunk in a helical path, a saw mounted on the supporting structure, and a drive motor which is connected to the saw and to the wheels. An automatic transmission reverses the direction of movement of the wheels when the saw has cut the branches from the tree to a height which may be selected in advance by the operator.

An object of the invention is the provision of an improved reversing transmission suitable for use in the briefly described branch removing machine.

Another object is the provision of a transmission which is compact and light, simple in its construction and operation, yet reliable.

A further object is the provision of a transmission which permits an operator to override the automatic controls of the transmission if desired, and to shift the power train of the branch lopping machine into an idling position, whereby the machine tends to descend along the tree trunk under its own weight.

The small size, low weight, simplicity, and reliability of the invention are achieved to a substantial extent by an arrangement in which all operating and control elements of the transmission are pivotable about parallel or even common axes.

In one of its more specific aspects, the invention provides a transmission arrangement in which a coupling member is connected to a rotatable input member for

2 joint rotation and is movable between two drive positions in which it respectively engages two output members for rotating the same, and an idling position in which it is disengaged from the output members. The movements of the coupling member are controlled by pivotal movement of a control member between an operative position and an inoperative position.

Motion is transmitted between the control member and the coupling member by interposed elements which move the coupling member from either one of its drive positions into the idling position when the control member moves from the operative position to the inoperative position, and move the coupling member from its idling position to one of the drive positions during the reverse movement of the control member.

The motion transmitting elements include a shifting member which is mounted for pivoting movement about an axis between a forward and rearward position in motion transmitting engagement with the control member so as to move the latter between its three positions during pivoting movement of the shifting member. Engaged parts of the control member and of the shifting member link the last-mentioned members with sufficient clearance in a radial and circumferential direction relative to the afore-mentioned axis of the shifting member to permit the coupling member to move between its three positions during movement of the control member between its operative and inoperative positions.

The linking parts of the control and shifting members abuttingly engage each other in a fixed relative position of these members when the control member is in its operative position and the coupling member is in the idling position. The linking parts also serve as guides for guiding the members toward this fixed position when the control member moves from the operative to the inoperative position.

Other features, additional objects and many of the attendant advantages of this invention will be readily appreciated as the same becomes better understood by reference to the following detailed description of a preferred embodiment when considered in connection with the accompanying drawings in which.

Figure 1:
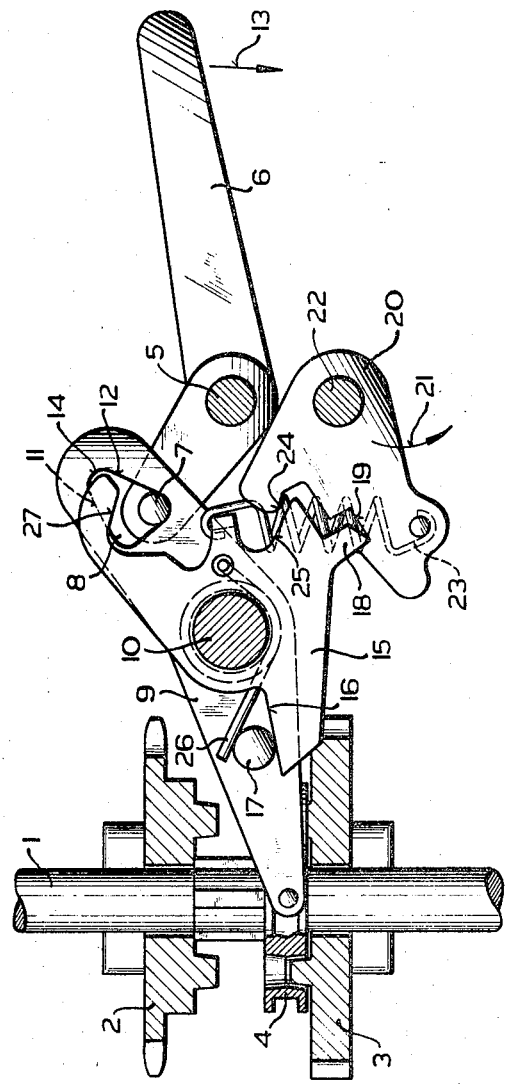
FIGURE 1 shows a reversing transmission of the invention in elevational section.

Referring now to the drawing in detail, there is shown only as much of a reversing transmission as is needed for an understanding of this invention. The driven input shaft 1 of the transmission carries two output wheels 2, 3 which are axially secured on the shaft 1, but freely rotatable thereon. The wheel 2 is a sprocket and the wheel 3 is a spur gear. A coupling wheel 4 is secured to the shaft 1 for joint rotation by interengaged splines and grooves which permit the wheel 4 to move axially between the position of FIGURE 1 in which axial bosses on the gear wheel 3 engage axial bores in the wheel 4, an idling position shown in FIGURE 3, and the position illustrated in FIGURE 2 in which the bores of the wheel 4 are engaged by bosses on the sprocket 2.

It will be understood that the gear wheel 3 drives a gear on the drive shaft of the nonillustrated branch lopping machine through an intermediate gear in a forward direction, whereas the sprocket 2 is connected by a chain to another sprocket on the machine shaft for rearward drive, the connection between the wheels 2 and 3 and the machine being evident from the afore-mentioned application and not shown in the instant drawing. The positions of FIGURES 1 and 2 will be referred to hereinafter as the forward and rearward drive positions respectively.

Figure 4:
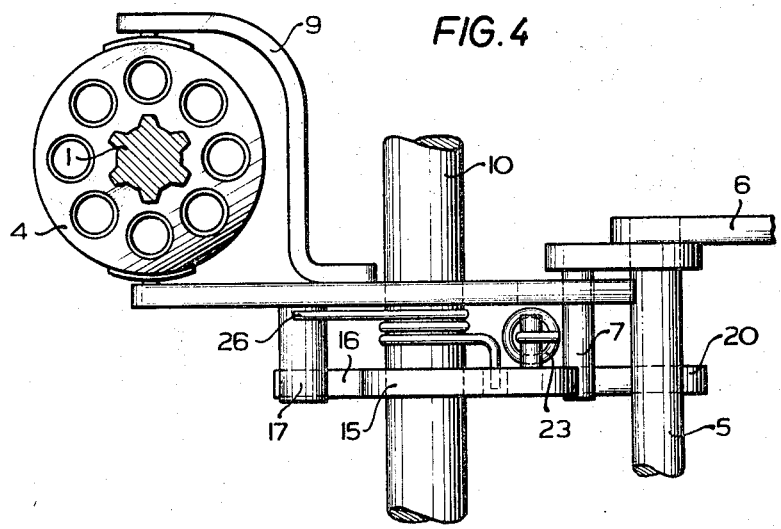
FIGURE 4 illustrates the transmission in sectional plan view while in the position of FIGURE 3.

The coupling wheel 4 is axially shifted between the three illustrated positions by a forked shifting lever 9 pivotally mounted on the shaft 10 of a reversing mechanism which is only partly shown in the drawing. Sliding blocks pivotally mounted at the end of a forked arm of the lever 9 engage a circumferential groove in the wheel 4, as best seen in FIGURE 4.

Figure 3:
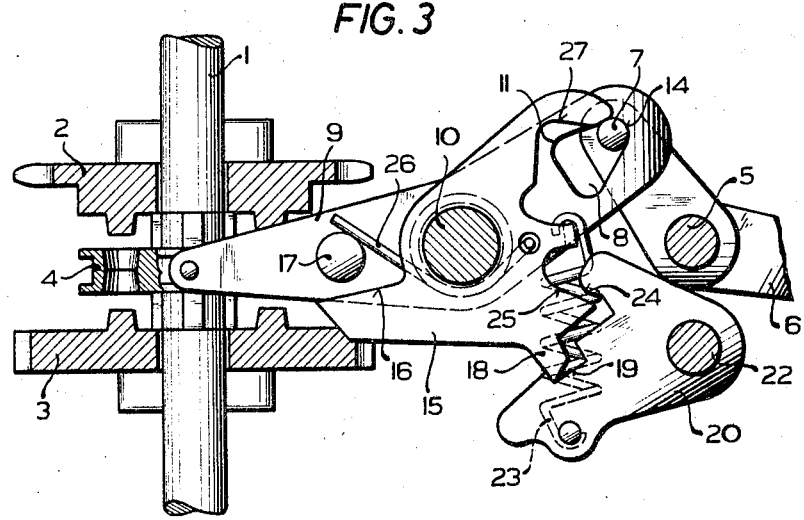

The wheel 4 is shifted between the drive positions and the idling position of FIGURE 3 by a manually operated control lever 6. A rope or similar tension member is normally attached to one arm of the lever 6 and extends within reach of an operator on the ground in all operating positions of the branch lopping machine of which the illustrated transmission is an integral element. The tension member permits the lever 6 to be turned maunally on a pivot 5 in the direction of an arrow 13, the pivot 5 being an element of the supporting machine structure, not fully illustrated in the drawing.

A linking pin 7 on the other arm of the lever 6 engages an approximately triangular opening 8 of the shifting lever 9 with ample radial and circumferential clearance relative to the parallel pivot axes of the linked members 6 and 9. The pin 7 abuts against the corner 14 between two angularly offset walls 11, 12 of the opening in the idling position of FIGURE 3, and occupies the other two corners of the opening 8 in the drive positions respectively.

A selector lever 15 pivotally mounted on the shaft 10 has an abutment face 16 which is held in engagement with an abutment pin 17 on the shifting lever 9 by a torsion spring 26 coiled about the shaft 10. The spring biases the lever 9 counter-clockwise, as viewed in FIGURES 1 and 3, toward the forward drive position of FIGURE 1.

A projecting blocking tooth 18 on the selector lever 15 is received in a recess 19 of a reversing arm 20 in the positions of FIGURES 1 and 3. The arm 20 is pivotally mounted on a shaft 22, parallel to the shaft 10 and fixedly attached to the nonillustrated supporting structure. A helical tension spring 23 tends to turn the arm 20 against the direction of an arrow 21 relative to the selector lever 15. The turning movement of the arm 20 in the direction of the arrow 21 is limited by engagement of an abutment lug 24 on the arm 20 with a U-shaped abutment face 25 on the selector lever 15. In the position of the transmission shown in FIGURE 1, movement of the selector lever 15 from the illustrated forward position to the rearward position shown in FIGURE 2 is blocked by the reversing arm 20.

The nonillustrated parts of the reversing mechanism include a speed-reducing drive connection between the afore-mentioned drive shaft of the branch lopping machine and the shaft 10, and a cam on the shaft 10 which engages the arm 20 after a predetermined number of revolutions of the drive shaft and temporarily pivots it from the illustrated inactive position in the direction of the arrow 21.

Figure 2:
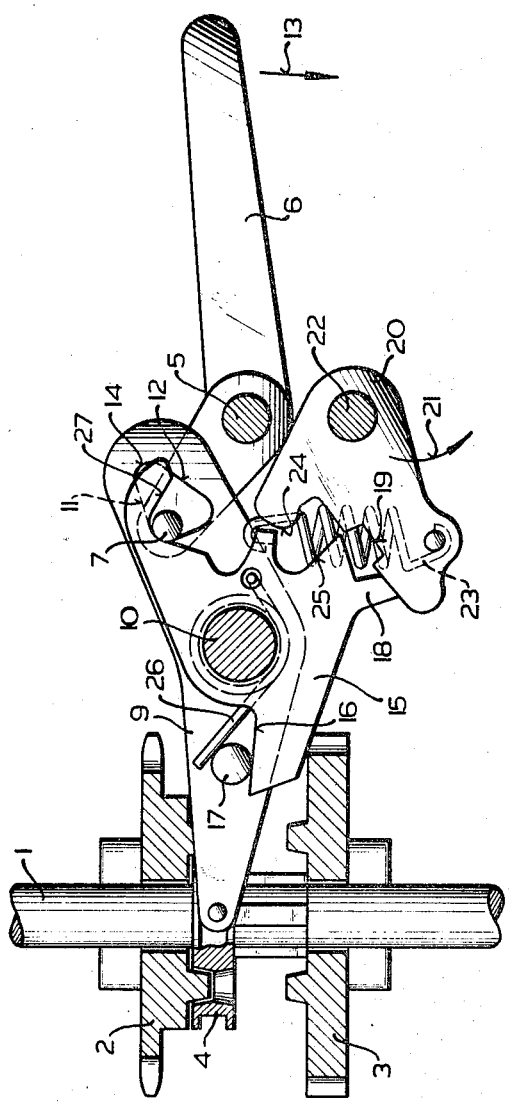
FIGURES 2 and 3 show the transmission of FIGURE 1 in different operating positions.

The arm of the selector lever 15 remote from the pin 17 is hook-shaped and defines a recess 27 which is engaged by the linking pin 7 of the control lever 6 in the rearward drive position of the device shown in FIGURE 2.

The afore-described transmission elements cooperate in the following manner:

The abutment face 16 of the selector lever 15 and the abutment pin 17 on the shifting lever 9 are held in abutting engagement by the spring 26 in such a manner that the shifting lever 9 is moved from the forward position of FIGURE 1 toward the rearward position of FIGURE 2 when the selector lever 5 moves in a clockwise direction, as viewed in the drawing. Conversely, movement of the shifting lever 9 from the backward toward the forward position causes the selector lever 15 to move counter-clockwise about the common axis.

As long as the reversing arm 20 is in the inactive position shown in all figures of the drawing, blocking engagement of the tooth 18 on the selector lever 15 and of the recess 19 in the reversing arm 20, as shown in FIGURES 1 and 3, blocks clockwise movement of the selector lever 15.

When the reversing arm 20 is temporarily swung from the illustrated inactive position toward a nonillustrated active position against the restraint of the spring 23, the spring 26 actuates the selector lever 15 to release the blocking tooth 18 from the recess 19 and to move the selector lever 15 clockwise from the position of FIGURE 1 into that of FIGURE 2.

The tooth 18 is again engaged in the recess 19 by the spring 23 when the reversing arm 20 reverts to its illustrated inactive position, and when the pin 7 on the control lever 6 cooperates with the recess 27 on the selector lever 15 while the lever 6 is being swung in the direction of the arrow 13 from the operative to the inoperative position. The spring 23 also biases the reversing arm 20 toward the illustrated inactive position.

The spring 26 has the additional function of biasing the abutment face 16 and the pin 17 toward each other, and for biasing the shifting lever 9 toward the forward position of FIGURE 1.

The afore-described transmission operates as follows:

During the upward movement of the nonillustrated branch lopping machine on a tree trunk, the transmission is in the position shown in FIGURE 1. The wheels of the machine are driven by a motor (not shown) which turns the shaft 1, and the movement of the shaft 1 is transmitted to the nonillustrated drive shaft of the machine by the spur gear 3. If it is desired to bring the apparatus down or to stop it before it reaches the height of automatic reversal, the rope attached to the control lever 6 is pulled to shift the lever 6 into the inoperative position of FIGURE 3, whereby the machine is set free from the motor to descend under the force of gravity.

The pivoting movement of the lever 6 in the direction of the arrow 13 causes the pin 7 to move in the opening 8 along the guiding wall 12 into the corner 14, thereby swinging the shifting lever 9 clockwise against the restraint of the spring 26 until the coupling wheel 4 assumes the idling position of FIGURE 3 when the pin 7 abuts against the corner 14. When the lever 6 is released to return to its operative position, the transmission is returned to the forward drive position of FIGURE 1 by the spring 26, and upward movement of the machine is resumed.

When the machine reaches the height set by the operator in the partly illustrated reversing mechanism, the arm 20 is briefly pivoted in the direction of the arrow 21 by the nonillustrated cam until the tooth 18 clears the recess 19 in the reversing arm 20, whereupon the selector lever 15 together with the shifting lever 9 is turned clockwise about the shaft 10 by the lug 24 engaging the abutment 25 and by the spring 26 so that the transmission assumes the position shown in FIGURE 2.

The pin 7 travels in the opening 8 from the guiding wall 12 to the guiding wall 11 during the shift from forward drive to rearward drive and engages the hook-shaped arm of the lever 15 is in the recess 27. The tooth 18 abuts against a surface of the reversing arm 20 outside of the recess 19.

If the driven reverse movement of the machine is to be interrupted, the control lever 6 is pivoted toward the inoperative position in the direction of the arrow 13. The pin 7 is thereby caused to slide along the wall 11 of the opening 8 into the corner 14, and to swing the shifting lever 9 and the selector lever 15 into the position shown in FIGURE 3. The spring 23 causes the tooth 18 to engage the recess 19, and the selector lever 15 is again in a position in which release of the control lever 6 causes the wheel 4 to shift into the forward drive position of FIGURE 1.

The illustrated transmission of the invention is simple in its construction, and has been found to be very reliable in operation, in part because of its simplicity. The control lever 6 moves only between two positions, an inoperative position and an operative position. Return from the inoperative to the operative position automatically sets the transmission for forward drive, but the transmission may be shifted from either drive position to the idling position by the control lever 6. The tree lopping machine may therefore be controlled by the lever 6 in a very simple manner.

An automatic multiple-speed transmission may be interposed between the output wheels 2, 3 of the illustrated reversing transmission and the wheels of the branch lopping machine in the manner disclosed in the aforementioned commonly owned applications, as will be obvious to those skilled in the art.

It is possible that the lever 6 is operated by the lever 136 of the device disclosed in the copending patent application Ser. No. 527,300 or by an output member of any other switching device. Such a switching device may for example be operated by wireless signals or may be combined with a metering device metering the climbing way of an automatic branch lopping machine so that after a predetermined climbing way the switching device operates by its output member the lever 6.

What is claimed is:

1. A transmission arrangement comprising, in combination:
    (a) a rotatable input member;
    (b) two rotatable output members;
    (c) a coupling member connected to said input member for joint rotation and movable between two drive positions in which said coupling member respectively engages said output members for rotating the same, and an idling position in which said coupling member is disengaged from said output members;
    (d) a control member pivotally movable between an operative position and an inoperative position; and
    (e) motion transmitting means operatively interposed between said control member and said coupling member for moving the coupling member from either one of said two drive positions into said idling position when the control member moves from said operative position to said inoperative position, and for moving said coupling member from the idling position to one of said two drive positions when the control member moves from the inoperative position to the operative position, said motion transmitting means including:
        (1) a shifting member mounted for pivoting movement about an axis between a forward position and a rearward position in motion transmitting engagement with said control member for movement of the coupling member between said three positions thereof during said pivoting movement, and
        (2) engaged linking means on said control member and on said shifting member,
        (3) the linking means on one of said control and shifting members engaging the linking means on the other one of said members with sufficient clearance in a radial and circumferential direction relative to said axis to permit movement of the coupling member between said positions thereof when the control member is in said operative position.
        (4) the linking means abuttingly engaging each other in a predetermined relative position of said shifting member and of said control member when said control member is in said inoperative position and the coupling member is in the idling position,
        (5) the linking means including cooperative guide means guiding said shifting member and said control member into said predetermined relative position when said control member moves from said operative to said inoperative position.

2. An arrangement as set forth in claim 1, wherein the linking means on one of said control and shifting members includes a pin member, the other one of said members being formed with an opening dimensioned to receive said pin member with said clearance.

3. An arrangement as set forth in claim 2, wherein said other member has three angularly offset walls in said opening, said walls and said pin member constituting said guide means, two of said walls jointly forming a corner, said corner abuttingly engaging said pin member in said predetermined relative position of said linking means, the third wall connecting said two walls and being remote from said corner.

4. An arrangement as set forth in claim 1, wherein said motion transmitting means include blocking means blocking movement of said coupling member from the idling position to the other one of said two drive positions when the control member moves from the inoperative position to the operative position thereof.

5. An arrangement as set forth in claim 1, further comprising:
    (i) a selector member mounted for angular movement about said axis;
    (ii) abutment means on said shifting member and on said selector member engageable for moving said shifting member from said forward position toward the rearward position thereof when the selector member moves about said axis in a predetermined direction;
    (iii) a reversing member movable between an active and an inactive position;
    (iv) blocking means on said reversing member and on said selector member engageable in said inactive position of the reversing member for blocking movement of the selector member in said pretetermined direction;
    (v) actuating means responsive to temporary movement of the reversing member from said inactive position to said active position for releasing said blocking means and for moving said selector member in said predetermined direction; and
    (vi) engaging means on said selector member and on said control member for engaging said blocking means in response to movement of the control member from the inoperative to the operative position when the reversing member is in the inactive position.

6. An arrangement as set forth in claim 5, further comprising yieldably resilient means secured to said reversing member and to said selector member for urging engagement of said blocking means.

7. An arrangement as set forth in claim 5, further comprising cooperating abutment means on said reversing member and on said selector member for moving the selector member in said predetermined direction when the reversing member moves from the inactive toward the active position.

8. An arrangement as set forth in claim 5, further comprising yieldably resilient means interposed between said selector member and said shifting member for biasing said engageable abutment means toward each other and for biasing said shifting member toward the forward position.

9. An arrangement as set forth in claim 5, wherein said control member and said reversing member are angularly movable about respective axes substantially parallel to said axis of pivoting movement of the shifting member.

10. An arrangement as set forth in claim 1, further comprising reversing means for moving said shifting member from one to the other one of said positions thereof while said control member is in said operative position.

References Cited

UNITED STATES PATENTS

| 1,499,418 | 7/1924 | Stevens. | |
| 1,540,247 | 6/1925 | Bowman. | |
| 2,192,439 | 3/1940 | Gustafson | 192—51 X |
| 2,648,415 | 8/1953 | Neighbor et al. | |
| 3,314,511 | 4/1967 | Randol | 192—89 |

BENJAMIN W. WYCHE III, *Primary Examiner.*

U.S. Cl. X.R.

192—83, 99, 33, 48.91